Oct. 11, 1960
J. P. CARROLL ET AL
2,955,845
TWIN ENGINE CRAWLER TRACTOR
Filed Sept. 14, 1954
5 Sheets-Sheet 1
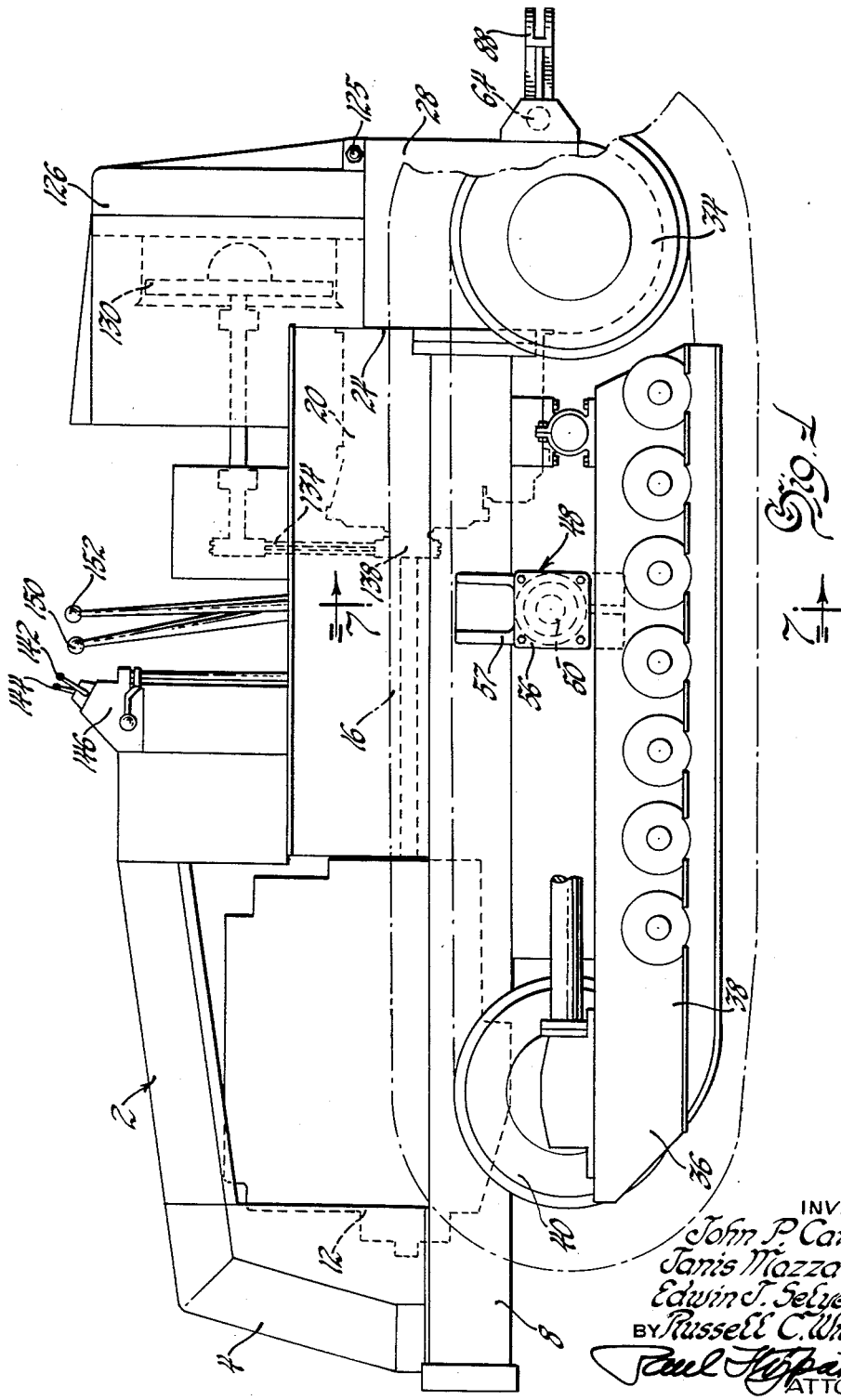
INVENTORS
John P. Carroll,
Janis Mazzarins,
Edwin J. Selyem &
Russell C. Williams
BY
ATTORNEY Oct. 11, 1960 J. P. CARROLL ET AL 2,955,845
TWIN ENGINE CRAWLER TRACTOR
Filed Sept. 14, 1954 5 Sheets-Sheet 2
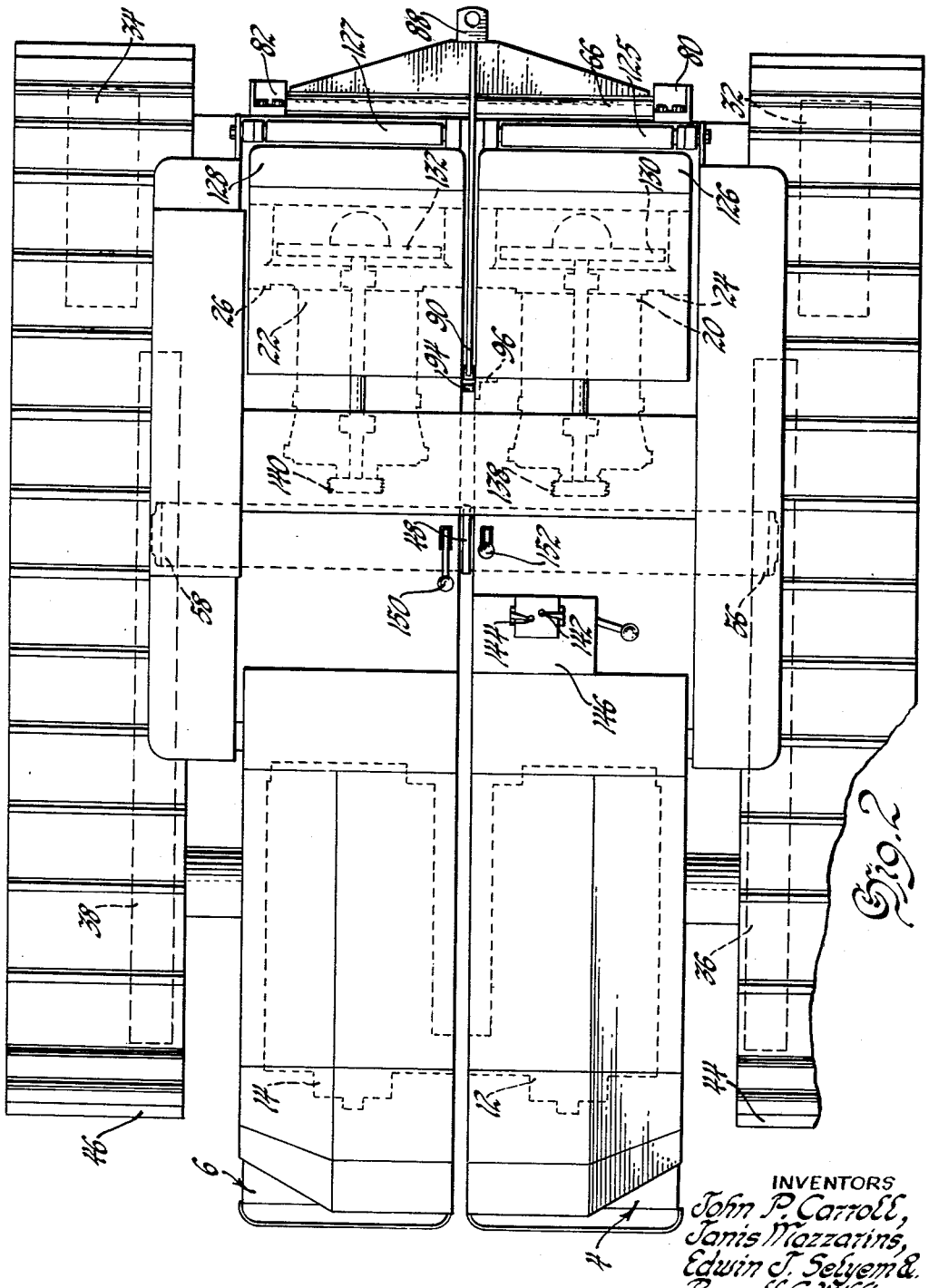
INVENTORS
John P. Carroll,
Janis Mazzarins,
Edwin J. Selyem &
BY Russell C. Williams
Paul Fitzpatrick
ATTORNEY

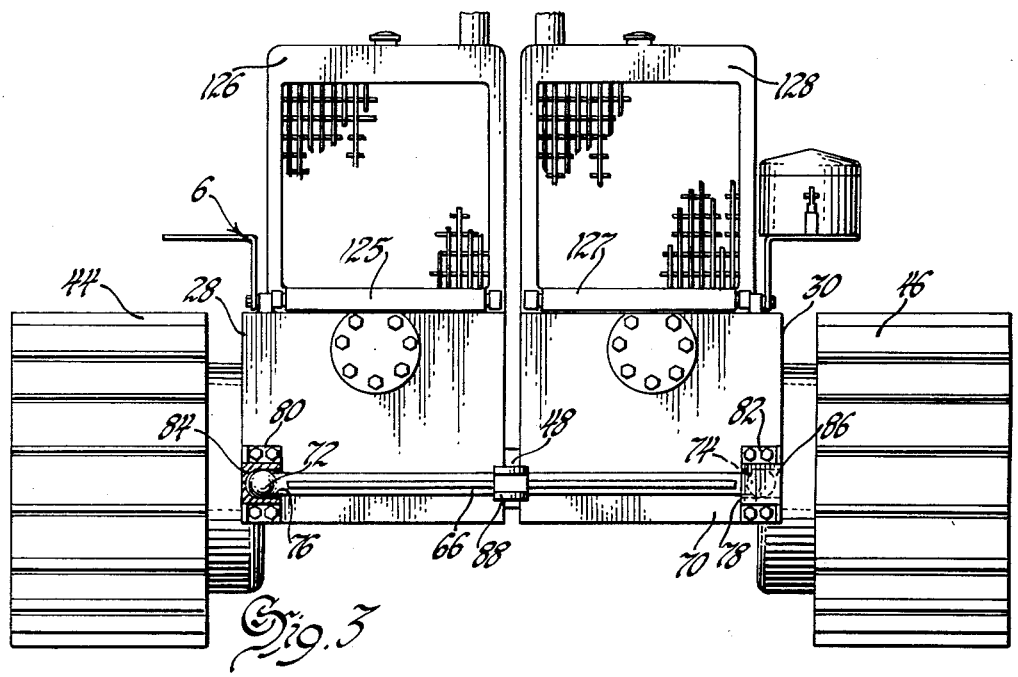
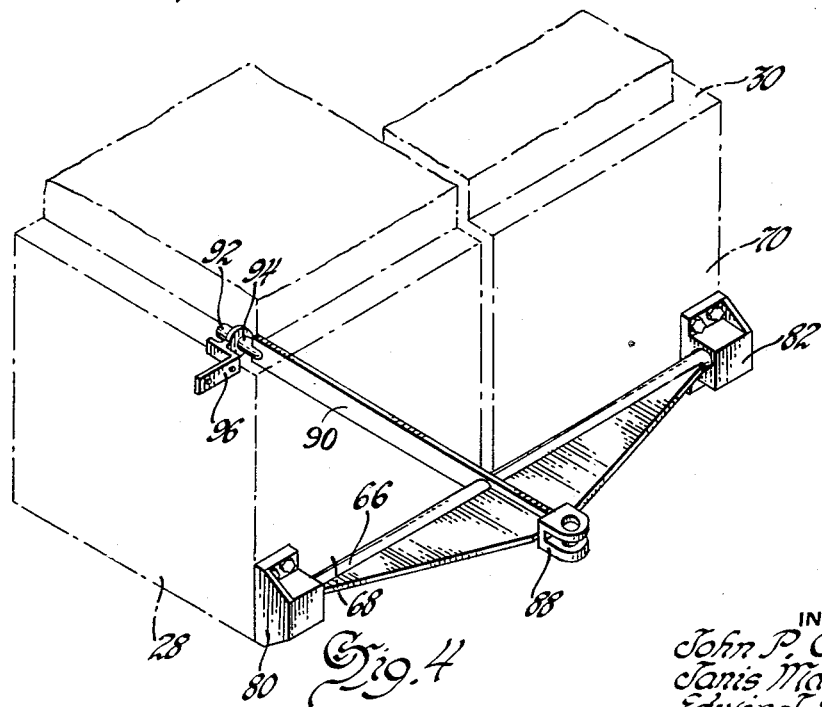

Oct. 11, 1960 J. P. CARROLL ET AL 2,955,845
TWIN ENGINE CRAWLER TRACTOR
Filed Sept. 14, 1954 5 Sheets-Sheet 4

INVENTORS
John P. Carroll,
Janis Mazzarins,
Edwin J. Selyem &
BY Russell C. Williams Paul Kilpatrick
ATTORNEY Oct. 11, 1960   J. P. CARROLL ET AL   2,955,845
TWIN ENGINE CRAWLER TRACTOR
Filed Sept. 14, 1954   5 Sheets-Sheet 5
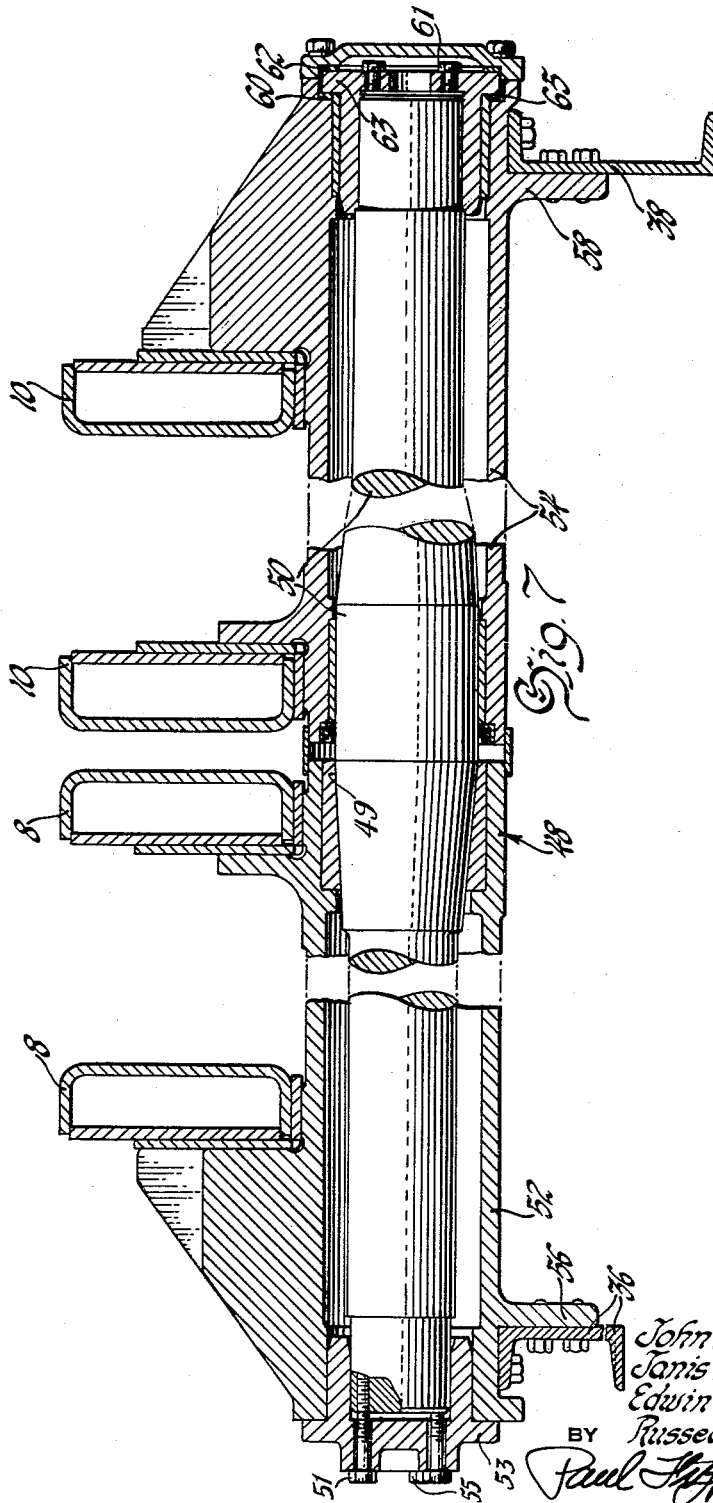
INVENTORS
John P. Carroll,
Janis Mazzarins,
Edwin J. Selyem &
Russell C. Williams
BY Paul Fitzpatrick
ATTORNEY

United States Patent Office 2,955,845
Patented Oct. 11, 1960

2,955,845
TWIN ENGINE CRAWLER TRACTOR

John P. Carroll, Fairview Park, Janis Mazzarins, Cleveland, Edwin J. Selyem, North Royalton, and Russell C. Williams, Rocky River, Ohio, assignors to General Motors Corporation, Detroit, Mich., a corporation of Delaware Filed Sept. 14, 1954, Ser. No. 455,903

4 Claims. (Cl. 280—400)

This invention relates to tracked vehicles and particularly to twin engine crawler tractors.

An object of the present invention is to provide a crawler tractor having independently powered endless ground engaging tracks mounted in a laterally spaced parallel relation.

Another object is to provide a crawler tractor comprising self-powered right and left tractor halves having a common transversely extending pivotal connection permitting independent vertical oscillation of one tractor half relative to the other.

Another object is to provide a tractor of the stated character wherein the radiator structure therefore is so mounted as to reduce passage of airborne dirt through the radiator during operation of the vehicle.

A further object is to provide in a twin engine crawler tractor having centrally arranged dual controls permitting both independent and synchronous operation of the ground engaging tracks.

Yet another object is to provide in a twin engine crawler tractor, a fixed draw bar structure rigidly attached to one of said tractor halves, the other of said tractor halves having a member coacting with said structure to limit the degree of relative vertical oscillation of the respective tractor halves.

Still a further object is to provide in a twin engine crawler tractor, an oscillating draw bar having one of its ends pivotally connected to one of the tractor halves and the other end connected to the other tractor half whereby to equalize the load between the oscillating tractor halves.

In accordance with the general features of the invention there is provided a crawler tractor wherein reversely similar tractor halves are connected in parallel slightly spaced apart relation in a manner permitting independent vertical oscillation about a common transverse axis disposed substantially mid-way between the longitudinal extremities of the vehicle. Each tractor half includes an endless ground engaging track assembly and is provided with a self-contained power plant and drive train, operatively connected to a track engaging drive sprocket. Close coupled dual controls are arranged centrally on the vehicle which are separately controllable to permit synchronous driving of each track in the same direction and independent driving of the respective tracks in opposite directions, as well as permitting idling or braking of one track while driving the other, and variations in relative track speed. A vehicle constructed in accordance with the general features of the invention has been found to provide greatly increased versatility compared with crawler tractors heretofore available, yet is easily and conveniently operated. Because of the infinite intermediate variations in control of the direction and speed of movement of the tracks resulting from the independent power feature, a virtually unlimited degree of manueverability is available to the operator.

In accordance with another feature of the invention the coolant containing radiators for each of the vehicle engines are disposed at the rear end of the vehicle while the fans for drawing air therethrough are mounted immediately forwardly of the radiator and are adapted for rotation in a direction causing air to pass rearwardly through the radiator. Since in normal operation large quantities of airborne dust and debris rise in front of track-laying vehicles, particularly when equipped with a bulldozer, previous crawler tractor constructions wherein the radiators were mounted at the forward end of the vehicle tended to become over-heated quickly because of clogging of the radiator air passages. In the present invention both the location of the radiators and the direction of operation of the radiator fans tends to minimize the radiator clogging resulting from airborne dust and debris.

In accordance with other features of the invention there are provided draw bar structures which permit maximum equalization of load between the tractor halves without interfering with the normal vertical oscillation of the latter as the vehicle passes over the irregular terrain.

Other features, objects and advantages of the invention will become more fully apparent as reference is made to the accompanying specification and drawings wherein:

Fig. 1 is a side elevational view partly in section showing the form and arrangement of the left-hand section of the crawler tractor, certain parts being broken away to more clearly illustrate the construction thereof.

Fig. 2 is a plan view of the crawler tractor showing the relationship of the right and left tractor sections and other details of construction.

Fig. 3 is a rear elevational view of the crawler tractor.

Fig. 4 is a fragmentary perspective view of the rear of the vehicle showing one form of draw bar construction.

Fig. 7 is an enlarged sectional elevational view, partly in section and with parts broken away, showing the form and construction of the transverse oscillating assembly.

Figure 5:
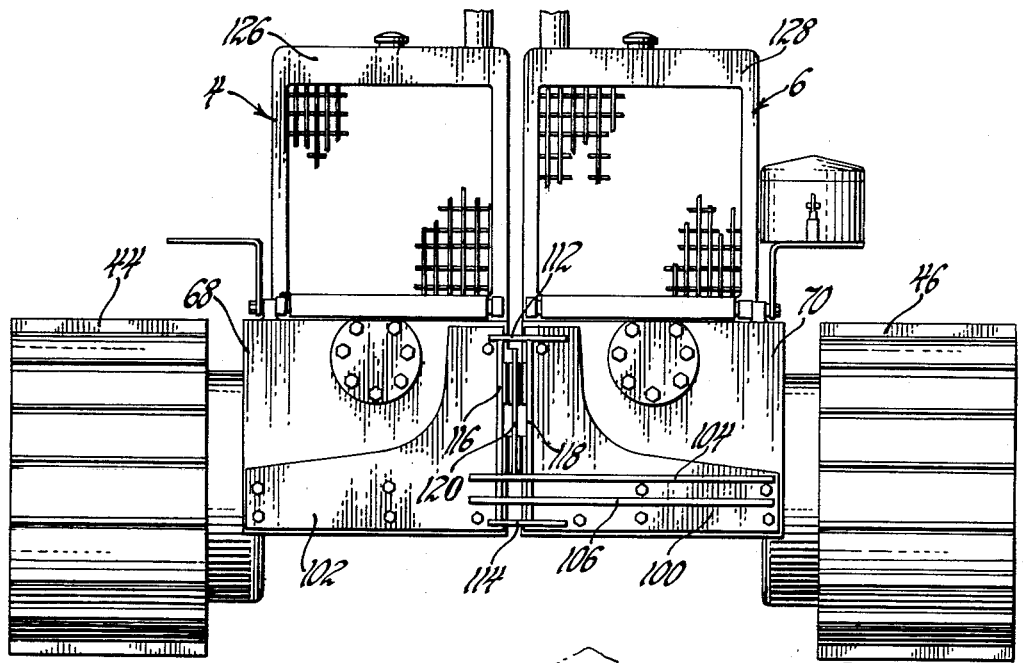
Fig. 5 is a view similar to Fig. 3, showing a modified form of draw bar mounted thereon.

Referring now to the drawings, and particularly to Figs. 1, 2 and 3, there is illustrated a crawler tractor 2 comprising left and right tractor sections 4 and 6. Each section 4 and 6 includes a longitudinally extending tractor frame 8 and 10, respectively. At the forward end of each frame 8 and 10, there is mounted a power plant 12 and 14, respectively. Power plants 12 and 14 are preferably diesel type engines. A pair of drive shafts 16 and 18 extend rearwardly from engines 12 and 14, respectively, and are operatively connected to the input side of torque converter type transmissions 20 and 22, respectively. Transmissions 20 and 22 are mounted on the forward walls 24 and 26 of housings 28 and 30, respectively. Housings 28 and 30 surround separate bevel gear drive mechanisms, not shown. Each transmission 20 and 22 is arranged for driving engagement with one of the bevel gear sets, not shown, each of which in turn operatively engages one of endless track driving sprockets 32 and 34. Each driving sprocket 32 and 34 is rotatably supported on one of tractor frames 8 and 10, respectively, and is provided with internal planetary reduction gearing, not shown. For a complete description of the structure of the internal gearing of sprockets 32 and 34, reference may be had to U.S. 2,543,811, Snow et al., issued March 6, 1951, assigned to General Motors Corporation. Disposed laterally outwardly from each tractor section 4 and 6 in parallel relation with tractor frames 8 and 10 are right and left track supporting frame structures 36 and 38. Track supporting frames 36 and 38 extend longitudinally forwardly from sprockets 32 and 34 in downwardly offset relation to tractor frames 8 and 10. Track frame 36 is rigidly connected to tractor frame 8 while track frame 38 is rigidly connected to tractor frame 10. At the forward end of each track frame 36 and 38, there are provided idler wheels 40 and 42, each of which is yieldably slidable fore and aft on one of frames 36 and 38. A pair of cleated endless track assemblies 44 and 46 surround drive sprockets 32 and 34 and idler wheels 40 and 42, respectively, and extend therebetween. Track assemblies 44 and 46 are movable in the conventional manner to provide tractive engagement with the ground.

In order to connect each tractor section 4 and 6 together to form unitary tractor constructions, there is provided a transversely extending oscillating mount 48, the opposite ends of which are connected to tractor sections 4 and 6, respectively. As seen best in Fig. 2, oscillating mount 48 is disposed substantially midway between the forward and rearward extremities of tractor 2, whereby the axis of oscillation of the tractor sections 4 and 6 is in substantial alignment with the center of gravity of the vehicle.

As seen best in Fig. 7, oscillating mount 48 comprises a large diameter solid bar 50 which extends between track frames 36 and 38 and has its opposite ends confined in transversely extending annular housings 52 and 54, respectively. Housing 52 is rigidly connected at its outer end 56 on track frame 36 and rigidly connected to tractor frame 8 at its inner end 57, while housing 54 is rigidly connected at its outer end 58 on track frame 38, and rigidly connected to tractor frame 10 at its inner end 59. Bar 50 is secured against axial and rotary movement in housing 52 and is mounted for rotary movement in housing 54. To secure bar 50 against axial and rotary movement in housing 52, a tapered sleeve 49 is press-fitted into housing 52 preferably adjacent its inboard end and the housing 54. The bar 50 is then pulled into the housing 52 through the sleeve 49, the bar 50 having a suitably tapered surface for bearing engagement with the sleeve 49. In addition, a plurality of bolts 51 extend through the end cap 53 of housing 52 and into the bar 50. Another series of bolts 55 secure the end cap to the housing 52. While the bolts 51, cap 53 and bolts 55 will act to secure the bar 50 against axial and rotary movement relative to the housing 52, the tapered sleeve 49 actually provides the greatest amount of force resisting such axial and rotary movement thereby relieving the aforementioned bolts of undue strain. In order to maintain tractor sections 4 and 6 in laterally spaced relation, thrust members 60 and 62 are disposed between the end cap 63 of bar 50 and the shoulder 65 of housing 52. The cap 63 is adjustably secured for relative axial movement to the bar 50 by bolts 61, and a suitable cover encloses the thrust members as shown in Fig. 7. Thrust members 60 and 62 prevent axial movement of housing 54 relative to bar 50. When connected in the manner described tractor sections 4 and 6 are independently swingable vertically about the axis of bar 50, while relative movement in other planes is resisted. To limit the degree of relative vertical movement of sections 4 and 6, suitable laterally extending lugs, not shown, may be mounted, preferably at the forward end of each tractor section, in a manner engaging the opposite tractor section upon predetermined elevation of one tractor section relative to the other.

In order to permit connection of drawn vehicles or other loads to the crawler tractor in accordance with one embodiment of the invention, there is provided an oscillating draw bar structure 64. As seen best in Figs. 3 and 4 draw bar 64 comprises a beam 66 which extends transversely between the rear walls 68 and 70 of final drive casings 28 and 30. At its opposite ends, beam 66 is provided with spherical heads 72 and 74 which are adapted for sliding engagement in cooperating transversely extending bores 76 and 78 formed in box-like brackets 80 and 82, respectively. Each bracket 80 and 82 is secured rigidly on walls 68 and 70, respectively, of final drive housings 28 and 30, and when in assembled position are spaced apart laterally so that the semispherical shoulders 84 and 86 at the bases of bores 76 and 78 are spaced a distance equivalent to the length of beam 66. However, upon displacement of one tractor section relative to the other, either spherical head 72 or 74 may move laterally inwardly relative to the base of its respective bore. Therefore, each tractor section is free to oscillate irrespective of the load connected to the draw bar 64. Mounted centrally on beam 66 and extending rearwardly therefrom is a clevis structure 88 adapted for connecting draft elements, not shown. In order to maintain clevis structure 88 in a horizontal plane when no load is attached thereto, there is provided at the lateral midline of beam 66 a forwardly extending arm 90 having a rod-like terminal extremity 92. Extremity 92 is adapted for insertion in an aperture 94 formed in a bracket 96 which in turn is rigidly secured to one of the tractor sections 4 or 6. Aperture 94 is preferably slightly larger in diameter than the outside diameter of terminal portion 92 in order to permit a limited degree of angular movement of the extremity 92 relative to the bracket.

Figure 6:
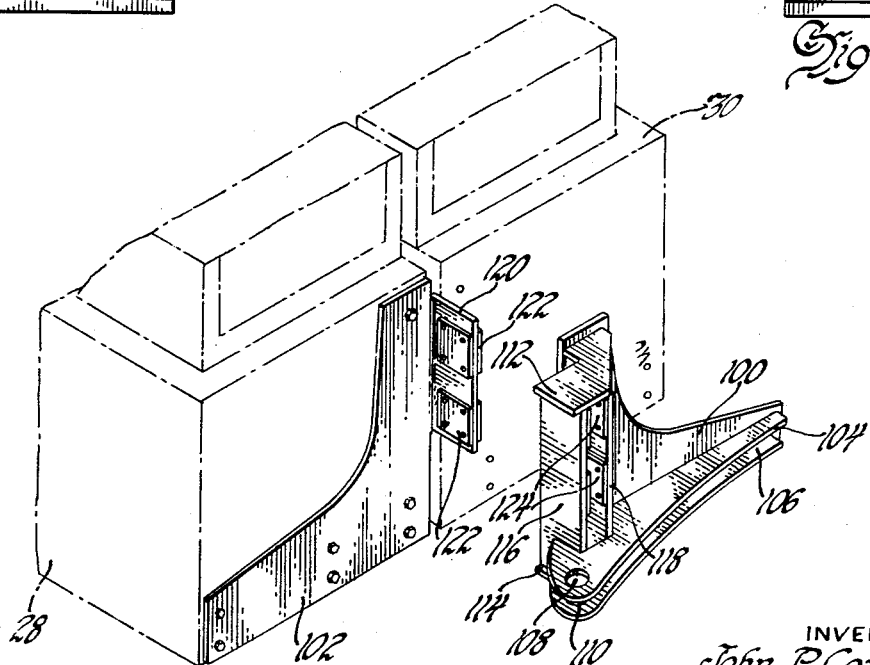
Fig. 6 is a fragmentary perspective view illustrating the form and arrangement of the draw bar construction of Fig. 5.

In Figs. 5 and 6 there is shown a modified form of draw bar construction. In the modified form a pair of plate-like brackets 100 and 102 are secured respectively to the walls 68 and 70 of final drive housings 28 and 30. Bracket 100 is provided with integral rearwardly extending vertically spaced apart plate members 104 and 106, the terminal extremities of which are formed with vertically aligned openings 108 and 110 to permit attachment of draft elements, not shown. Bracket 100 is also provided with a pair of vertically spaced laterally inwardly and rearwardly offset extensions 112 and 114 which are secured respectively at the upper and lower extremities of the bracket. A pair of laterally spaced generally parallel vertically extending wall portions 116 and 118 extend between wall portions 112 and 114 and are rigidly connected thereto as by welding. At its lateral inner edge, bracket 102 is provided with an integral vertically directed rearwardly extending tongue member 120 which is adapted for disposition between the walls 116 and 118 secured on bracket 100. When brackets 100 and 102 are assembled on casings 28 and 30, tongue 120 is movable vertically between walls 116 and 118 within the limits defined by extensions 112 and 114. It will thus be seen that by suitably dimensioning tongue 120, the degree of relative vertical oscillation between tractor sections 4 and 6 may be limited to any desired amount.

In addition to controlling the degree of relative vertical movement between tractor sections 4 and 6, the modified form of draw bar construction is adapted to reduce lateral separation or angular spreading of the tractor sections. To accomplish this purpose, walls 116 and 118 and tongue 120 are preferably provided with hardened wear plates 122 and 124. As seen in Fig. 6 wear plates 122 are secured on the lateral outward surfaces of tongue 120 while wear plates 124 are secured adjacent the inner faces of vertically extending wall members 116 and 118. When in assembled relation wear plates 122 and 124 are adapted for close lateral interfitting relation and thus reduce lateral angular spreading of tractor sections 4 and 6 about the axis of oscillating mount 48.

In accordance with another feature of the invention, a pair of radiators 126 and 128 are mounted above each final drive casing 28 and 30. Radiators 126 and 128 are preferably hingedly connected at 125 and 127 to casings 28 and 30 to permit easy access to the transmissions 20 and 22. Each of radiators 126 and 128 is connected, respectively, in communicating relation with the cooling system of engines 12 and 14. Directly behind each radiator there are provided rotatably mounted fan members 130 and 132 which are operatively connected, respectively, by means of belts 134 and 136 with pulley assemblies 138 and 140 formed at the input side of transmissions 20 and 22, respectively. In operation, fans 130 and 132 adapted for rotation in a direction causing air flow rearwardly through radiators 126 and 128. By virtue of the location and arrangement of radiators 126 and 128 and fans 130 and 132, radiator clogging due to entrance of suspended dust and debris is greatly reduced, as compared to previous tractor structures where the radiators are mounted in close proximity to the forward end of the vehicle.

In order to provide maximum versatility and ease of operation of the crawler tractor, manual controls for the power plant, transmission, brakes, etc. for both tractor sections are grouped in closely adjacent side-by-side relation on the upper middle portion of one of the tractor sections. Throttle control levers 142 and 144 are pivotally mounted on a pedestal 146 disposed on tractor section 4 and are provided with Bowden cable connections, not shown, which operatively engage the respective engines 12 and 14. Reversing levers 150 and 152 are mounted in side-by-side relation, between sections 4 and 6, each lever being pivotally secured to one tractor section. However, the pivotal connections for levers 150 and 152 are sufficiently close to the common transverse axis 48, about which tractor sections 4 and 6 oscillate, that only slight relative movement occurs between the levers throughout the maximum range of relative movement of tractor sections 4 and 6.

From the foregoing it will be seen that a novel and highly efficient crawler tractor construction has been provided. The greatly increased versatility and maneuverability of the present invention is to be particularly noted. Because of the provision of entirely self-contained power plants and power transmission means in each of said tractor sections, unique operating features are attainable. By way of example, a crawler tractor constructed in accordance with the features of the present invention is capable of turning movements at an accelerated rate heretofore unobtainable. In order to execute rapid turns with the present construction one of the endless tracks may be driven in a forwardly progressing direction while the opposite endless track is propelled rearwardly. When operated in this manner the vehicle may be virtually pivoted on a vertical axis. Another advantage of the present construction is that slight changes in forward path of movement of the vehicle may be adjusted by manipulation of the throttle controls rather than temporarily braking one of the endless track mechanisms. It should be noted that the present construction permits optimum vertical oscillation of the endless track structures yet retains the maximum vehicle weight over the central section of each track assembly and thus assures maximum ground contact even when operated over extremely rugged terrain. It will also be noted that although maximum oscillation of the endless tracks is permitted, no variation in linear distance between the drive sprockets and idler wheels occurs during oscillating movement of the track structure, whereas in the prior art oscillating track structures have either pivoted about the axis of the driving sprocket or have pivoted in a manner causing relative displacement thereof with reference to the driving sprocket. In the former case oscillation of the track assemblies had tended to cause shifting of the vehicle weight with respect to the tracks, while in the latter case relatively great movement of the idler wheel is required in order to compensate for variations in slackness of the endelss tracks.

While various embodiments of the invention have been shown and described it will be apparent that other changes and modifications may be made therein. It is therefore to be understood that it is not intended to limit the invention to the embodiments shown, but only by the scope of the claims which follows.

We claim:

1. In a crawler tractor of the type having right and left tractor halves mounted for independent vertical oscillation about a common transversely extending axis, a draw bar structure for attaching loads to said tractor comprising a bracket fixed rigidly at the rear of one of said tractor halves, a second bracket fixed rigidly at the rear of the other of said tractor halves, said first bracket having an integral rearwardly extending tongue portion, said second bracket having an integral rearwardly extending slotted portion, said slotted portion being adapted to surround said tongue portion and having upper and lower surfaces providing tongue abutments limiting relative oscillation of said tractor halves, and a plurality of hardened wear plates secured to the inner side walls and outer side walls of said slot and said tongue respectively, said wear plates being closely inter-fitted laterally to reduce separation of said tractor halves.

2. In a crawler tractor of the type having right and left tractor halves mounted for independent vertical oscillation about a common transversely extending axis, a draw bar structure for attaching loads to said tractor comprising a bracket fixed rigidly to the rear of one of said tractor halves, a second bracket fixed rigidly to the rear of the other of said tractor halves, said first bracket having an integral rearwardly extending tongue portion, said second bracket having an integral rearwardly extending slotted portion, said slotted portion being adapted to surround said tongue portion and having upper and lower surfaces providing stops to limit relative oscillation of said tractor halves, a plurality of hardened wear plates secured respectively to the inner side walls of said slot and the outer side walls of said slot respectively, said wear plates being closely interfitted laterally to reduce lateral separation of said tractor halves, and a clevis structure associated with one of said brackets for connecting external load thereto.

3. In a crawler tractor of the type having right and left tractor halves mounted for vertical oscillation about a common transversely extending axis, a guide structure comprising a first member fixed with relation to one of said tractor halves, a second member fixed with relation to the other of said tractor halves, a tongue formed on one of said members and extending therefrom longitudinally of said tractor, and means on the other of said members forming a slot embracing said tongue at laterally spaced points to reduce lateral separation of said tractor halves, and having sufficient vertical extent tot form a lost motion connection with said tongue to limit the degree of vertical oscillation of said tractor halves.

4. In a crawler tractor of the type having right and left tractor halves mounted for independent vertical oscillation about a common transversely extending axis, a drawbar structure for attaching loads to said tractor comprising a bracket fixed rigidly at the rear of one of said tractor halves, a second bracket fixed rigidly at the rear of the other of said tractor halves, said first bracket having an integral rearwardly extending tongue portion, and said second bracket having an integral rearwardly extending slotted portion surrounding said tongue portion, said slotted portion having upper and lower surfaces providing tongue abutments limiting relative vertical oscillation of said tractor halves, and side surfaces embracing said tongue portion to reduce lateral separation of said tractor halves.

References Cited in the file of this patent

UNITED STATES PATENTS

| Number | Name | Date |
| --- | --- | --- |
| 684,793 | Coles | Oct. 22, 1901 |
| 1,429,464 | Thompson | Sept. 19, 1922 |
| 1,430,251 | Parker | Sept. 26, 1922 |
| 1,675,013 | Young | June 26, 1928 |
| 2,075,085 | Paton | Mar. 30, 1937 |
| 2,100,490 | Rippingille | Nov. 30, 1937 |
| 2,513,942 | Johnson et al. | July 4, 1950 |
| 2,551,231 | Anderson | May 1, 1951 |
| 2,572,911 | Brown | Oct. 30, 1951 |
| 2,678,105 | Peterson | May 11, 1954 |